April 25, 1950     A. VAN DUYN     2,505,345
CLAMPING DEVICE FOR FOOD SLICERS
Filed Dec. 24, 1946     2 Sheets-Sheet 1
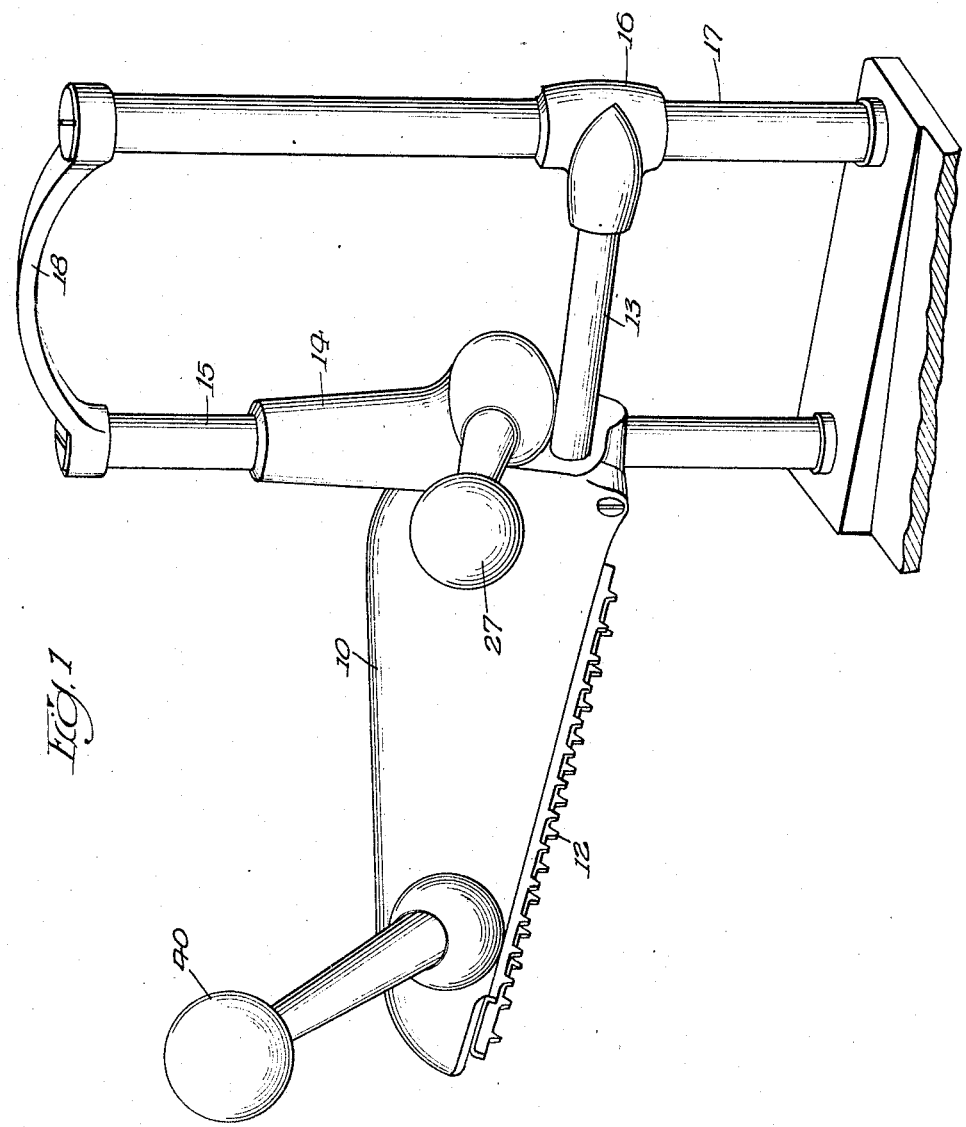
Inventor
ADRIANUS VAN DUYN
By: Spencer, Marzall, Johnston & Cook
Attys April 25, 1950      A. VAN DUYN      2,505,345
CLAMPING DEVICE FOR FOOD SLICERS
Filed Dec. 24, 1946      2 Sheets-Sheet 2
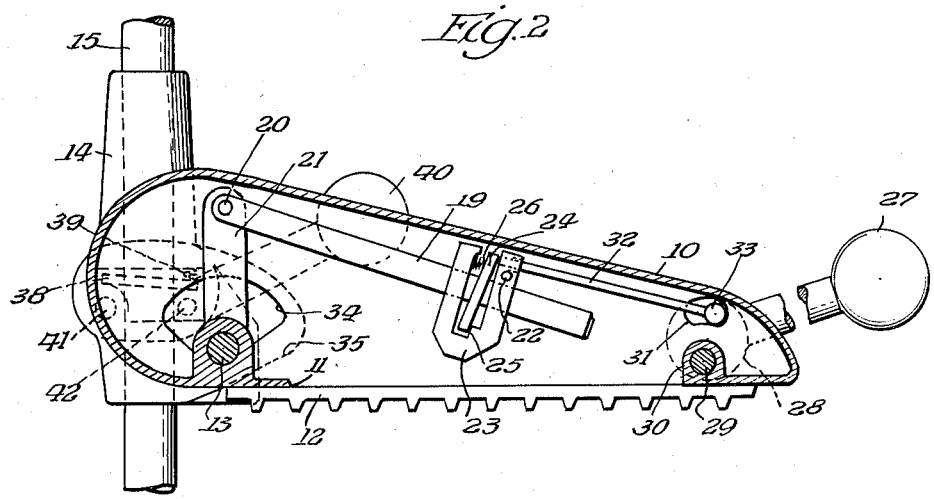
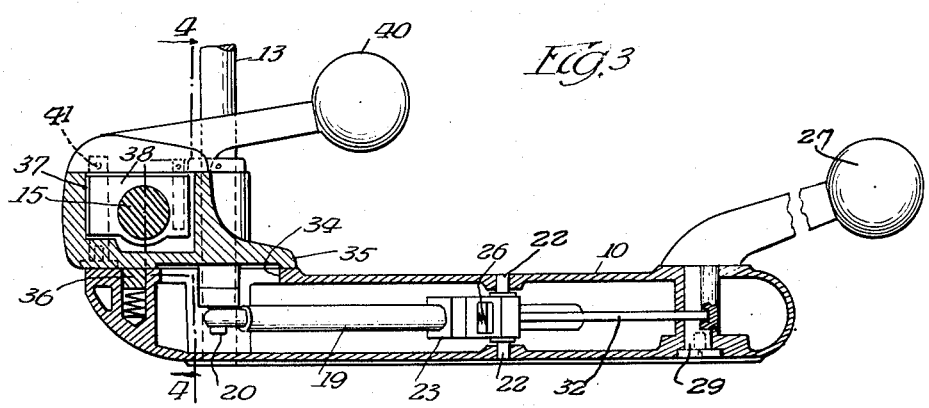
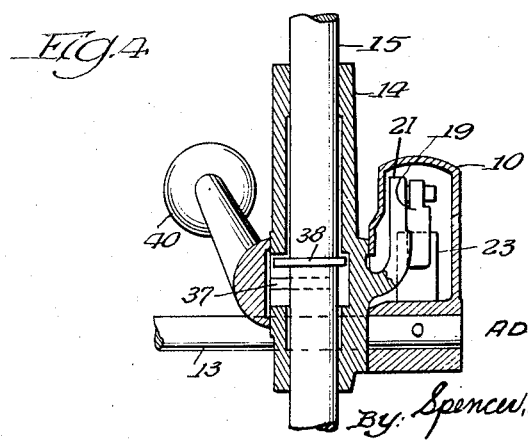
INVENTOR.
ADRIANUS VAN DUYN
By Spencer, Marzall, Johnston & Cook
Att'ys Patented Apr. 25, 1950

2,505,345

UNITED STATES PATENT OFFICE 2,505,345

FOOD CLAMPING DEVICE FOR FOOD SLICERS

Adrianus van Duyn, Hillegersberg, Netherlands, assignor to U. S. Slicing Machine Company, Inc., a corporation of Indiana Application December 24, 1946, Serial No. 718,135
In the Netherlands November 19, 1941

Section 1, Public Law 690, August 8, 1946
Patent expires November 19, 1961

4 Claims. (Cl. 146—217)

1

This invention relates, in general, to improvements in article holders or clamping devices for use with food slicing machines, and more specifically to that type embodying a clamping member or arm which is pivotally connected to an upright or support for vertical adjustment with respect thereto, and which is so controlled in its adjustment and operation that it may be locked or secured in any position of adjustment with respect to the upright.

Another object is to provide a device of this character, which is angularly adjustable under the control of mechanism which connects it to the support or upright.

A further object of the invention is to provide an improved device of this character, whereby the adjustment and anchoring mechanisms are protected from becoming fouled by dirt, grease, food particles, or other foreign matter.

A still further object is to provide an improved clamping or holding device of this character, in which the mechanism for controlling the angular position of the clamp arm or member, and the vertical position of its support, are enclosed in casings, and are operable by handles, each having a connection with the associated mechanism through a closed bearing in the associated casing.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings, in which:

Fig. 1 is a perspective view of a clamping or holding device of this character, embodying the features of this invention.

Fig. 2 is a longitudinal vertical sectional view of the clamp.

Fig. 3 is a horizontal sectional view.

Fig. 4 is a detail sectional view on line 4—4, Fig. 3.

The clamp consists essentially of an enclosed hollow arm or member 10, preferably having an opening 11 in its lower face, which opening is closed by a serrated or toothed bar 12, and the arm may be of any desired size and configuration, and constructed of any suitable material. The arm is pivotally mounted adjacent one end thereof, on a horizontal shaft 13 which extends through a vertically adjustable support 14, which is slidably mounted on an upright 15.

The shaft 13 also enters a supplemental support 16, that is slidably mounted upon an upright 17, whereby the clamp will be maintained

2 against rotation about the support 15. If desired, these uprights 15, 17 may be connected together at the upper ends thereof by means of a connecting bar or member 18.

The clamp is angularly adjustable about its pivotal mounting, which is the shaft 13, by means of a variable length actuating bar or member which comprises a section 19, pivotally connected, as at 20, to an upright or bracket member 21 that is rigidly connected to the sleeve or support 14, that moves upon the upright 15.

Another portion or section of the actuating bar or member embodies a locking element pivotally supported by a pivot pin 22 within the arm, and through which element the rod or section 19 is slidable. The locking element embodies a body portion 23, preferably of substantially U-shaped configuration, and is provided with a co-operating locking plate 24, through which the rod or section 19 also passes. The opening in the locking plate 24 is of a diameter greater than the external diameter of the rod or section 19, so that when the plate is moved into a substantially right angular position with respect to the section 19, the section and plate will freely slide, one with respect to the other, but when disposed in an inclined plane with respect to the rod or section, the two will be locked together against relative movement in directions lengthwise with respect to the rod or section 19. The plate 24 fulcrums upon a shoulder or portion 25, and a spring 26 tends normally to tilt the plate and cause it to bind upon the rod or section 19.

The plate 24 is released from its locking position with respect to the rod 19, by means of a releasing device embodying an operating handle 27 arranged on the outside of the clamping member 10, which is connected to a crank or disc 28. The disc or crank 28 is journaled by a pin or shaft 29, in a bearing 30, within the arm, and the hollow arm is provided with a slot 31 in its wall.

A rod or bar 32 is provided, at one end, with a pin or projection 33 that extends through the slot 31, and is connected to the disc 28. The other end of the rod 32 slides through a bearing in the locking element 23, so as to engage and move the plate 24 with respect to the element 23, and against the stress of the spring 26, to unlock the rods 19 and 32 with respect to each other, so that they may be longitudinally adjusted or moved, one with respect to the other, for extension or contraction. The slot 31 is of a size to permit operation of the handle with respect to the arm 10.

Thus it will be seen that by operating the handle 27, the rod sections 19 and 32 may be locked or unlocked with respect to each other, to either lock the clamping member 10 against movement about its pivot 13, or unlock it so that it can be so adjusted or moved. By depressing the handle 27, the arm 10 will first be unlocked, i. e., by rendering the locking plate 24 ineffective and lowering the arm about its pivot 13. When the downward pressure is relieved, the clamping or locking plate 24 resists upward movement of the clamp or arm 10, which might occur by reason of reaction of the material being clamped.

In order to raise the arm or clamp 10, the handle 27 may be raised or turned upwardly, and this will release the clutch formed by the plate 24, in the manner above set forth, and will also cause the rods 32 and 19 to be contracted with respect to each other, or moved together in directions lengthwise of the rods. The pivotally mounted end of the clamp or arm 10 is provided with an opening 34, through which the shaft 13 and bracket 21 project into the clamp or arm 10, and which opening is of sufficient size to permit of the pivotal movement of the clamp. This opening, however, is closed by a suitable surface 35 on the vertically adjustable support 14.

An internal spring-urged friction pad 36 bears upon the surface 35, and serves as a means for preventing inadvertent downward angular movement of the clamp or arm 10, due to its weight. The vertically adjustable support or supporting sleeve 14 is also shaped to form a casing or housing having a chamber 37 therein, the chamber being provided with a clutch mechanism similar to the clutch element between the rods 19 and 32. To that end, there is provided a clutch plate or member 38, through which the upright 15 loosely passes so as to afford free movement of the support 14 when the plate 38 is in a predetermined position with respect thereto, and to lock the support against such movement when the plate 38 is inclined a predetermined extent with respect thereto.

A spring 39 tends normally to move the plate 38 into a locking position with respect to the support 14 and the upright 15. A manually operated device such as a handle 40, arranged outside of the chamber 37, is pivotally supported, as at 41, and is provided with a laterally extending pin or projection 42 that projects into the chamber 37, below the locking plate 38, and is movable by the handle 40 into engagement with the locking plate 38, to swing it about its pivot 41, against the stress of the spring 39, to release the support 14 so that it may be freely moved upon the upright 15. The open side of the chamber 37 is closed by a portion of the support 14, which is suitably shaped for that purpose.

Thus it will be seen that all of the parts of the clutch or securing device for maintaining the clamp or member 10 in its adjusted position, with the exception of the operating handles 27 and 40, are completely housed and protected against fouling with dirt, grease, particles of food, or other matter, and provide not only an efficient clamping device, but also one that is sanitary.

While the preferred form of the invention has been herein shown and described, it is to be understood that various changes may be made in the details of construction, and in the combination and arrangement of the several parts, within the scope of the claims, without departing from the spirit of this invention.

What is claimed as new is:

1. An article clamping device for food slicing machines embodying a completely closed hollow article clamping arm of rigid construction; an upright; a rigid supporting sleeve for said arm slidably mounted on the upright; a shaft carried by said sleeve and having an end extending into one end of the arm through an opening therein and pivotally mounting the arm for movement in an upstanding plane, said arm and said sleeve being formed to provide merging surfaces that accommodate pivotal movement of the arm while said sleeve closes the shaft opening in said arm, said sleeve being also formed to provide a chamber extending about the upright; longitudinally extendible and contractible holding means connected between the supporting sleeve and the other end of the arm and housed within the arm for holding said arm against pivotal movement throughout a range of selected positions; a rotary operating device for said holding means extending into the arm through an opening therein and including closing means extending across said operating device opening; a clutch mechanism acting on the upright independently of the operation of said arm and holding means and disposed within the chamber of said sleeve for releasably maintaining said sleeve in selected positions along said upright; and a rotary operating device for said clutch mechanism extending into said chamber through an opening in said sleeve and including closing means extending across said sleeve opening.

2. An article clamping device for food slicing machines embodying a completely closed hollow article clamping arm; an upright; a supporting sleeve for said arm slidably mounted on the upright; a shaft carried by said sleeve and having an end extending into the arm through an opening therein and pivotally mounting the arm for movement in a vertical plane, said arm and said sleeve being formed to provide merging surfaces that accommodate pivotal movement of the arm while said sleeve closes the shaft opening in said arm, said sleeve being also formed to provide a chamber extending about the upright; longitudinally adjustable holding means connected between said sleeve and a remote end portion of the arm and housed within the arm for maintaining said arm against pivotal movement throughout a range of selected positions; an operating device for said holding means pivotally mounted on the outside of the arm and including means extending into the arm through an opening therein and means closing said operating device opening; a clutch mechanism acting on the upright and disposed within the chamber of said sleeve for releasably maintaining said sleeve in selected positions along said upright; and an operating device for said clutch mechanism pivotally mounted on the outside of the sleeve and including means extending into said chamber through an opening in said sleeve and means closing said sleeve opening.

3. An article clamping device for food slicing machines embodying a completely closed hollow article clamping arm; first and second spaced uprights; a supporting sleeve for said arm slidably mounted on the first upright; a shaft slidably connected by one end to the second upright and having its other end extending through said sleeve and into the arm through an opening therein and pivotally mounting the arm for movement in a vertical plane, said arm and said sleeve being formed to provide merging surfaces that accommodate pivotal movement of the arm while said sleeve closes the shaft opening in said arm, said sleeve being also formed to provide a chamber extending about the upright; locking means connected with the sleeve through said shaft opening and housed within the arm for holding said arm against pivotal movement throughout a range of selected positions; an operating device for said locking means extending into the arm through an opening therein and including means closing said operating device opening; a clutch mechanism acting on the first upright and disposed within the chamber of said sleeve for releasably maintaining said sleeve in selected positions along said first upright; and an operating device for said clutch mechanism extending into said chamber through an opening in said sleeve and including means closing said sleeve opening.

4. An article clamping device for food slicing machines embodying a completely closed hollow article clamping arm; first and second spaced uprights; a supporting sleeve for said arm slidably mounted on the first upright; a shaft slidably connected by one end to the second upright and having its other end extending through said sleeve and into the arm through an opening therein and pivotally mounting the arm for movement in a vertical plane, said arm and said sleeve being formed to provide merging surfaces that accommodate pivotal movement of the arm while said sleeve closes the shaft opening in said arm, said sleeve being also formed to provide a chamber extending about the upright; locking means connected with the sleeve through said shaft opening and housed within the arm for holding said arm against pivotal movement throughout a range of selected positions; an operating device for said locking means extending into the arm through an opening therein and including means closing said operating device opening; an inwardly yielding friction member mounted in the arm adjacent the shaft and engaging an abutting surface of the sleeve for resisting free pivotal movement of the arm when the locking means is released; a clutch mechanism acting on the first upright and disposed within the chamber of said sleeve for releasably maintaining said sleeve in selected positions along said first upright; and an operating device for said clutch mechanism extending into said chamber through an opening in said sleeve and including means closing said sleeve opening.

ADRIANUS van DUYN.

REFERENCES CITED

The following references are of record in the file of this patent:

UNITED STATES PATENTS

| Number | Name | Date |
|---|---|---|
| 1,175,025 | Van Berkel | Mar. 14, 1916 |
| 1,801,250 | Stukart | Apr. 14, 1931 |
| 1,915,340 | Van Berkel | June 27, 1933 |

FOREIGN PATENTS

| Number | Country | Date |
|---|---|---|
| 314,202 | Great Britain | Mar. 12, 1929 |
| 380,236 | Great Britain | May 26, 1932 |
| 56,142 | Netherlands | Mar. 16, 1944 |